3,554,689
Patented Jan. 12, 1971

3,554,689
METHODS OF REMOVING CARBON
OXYSULFIDE FROM GASES
Rudolf H. Bloembergen and Weigert C. Buningh, Amsterdam, and Adrianus Petrus Bally, The Hague, Netherlands, assignors to Shell Oil Company, New York, N.Y., a corporation of Delaware
No Drawing. Filed Oct. 5, 1967, Ser. No. 672,977
Claims priority, application Netherlands, Oct. 24, 1966, 6615007
Int. Cl. B01d 53/00; C01b 1/30
U.S. Cl. 23—2
7 Claims

ABSTRACT OF THE DISCLOSURE

A process for the removal of carbon oxysulfide from oxygen and hydrogen containing gases comprising substantially completely removing oxygen by reaction with hydrogen in the presence of a highly active hydrogenation catalyst at a temperature below 150° C. and thereafter catalytically hydrolyzing the carbon oxysulfide to hydrogen sulfide at a temperature below 150° C.

BACKGROUND OF THE INVENTION

Field of the invention

This invention relates to a process for the removal of hydrogen sulfide and carbon oxysulfide from gases; more particularly, it relates to a process for the efficient conversion of carbon oxysulfide to hydrogen sulfide from gases containing hydrogen and carbon monoxide obtained from the partial oxidation of carbon-containing fuels. Carbon-containing fuels within the scope of the invention are understood to include any fuel containing free and/or chemically bound carbon exemplified by but not restricted to coke, coal, natural gas, crude petroleum and crude or refined petroleum fractions.

Description of the prior art

Combustion gases are, of course, important sources of hydrogen and carbon monoxide. Partial combustion, or gasification, of carbon-containing fuels is a well known and customary process for hydrogen and carbon monoxide production. In this process, air, oxygen, or oxygen-enriched air is usually used as the oxidant and the reaction is carried out in the presence of added steam and/or carbon dioxide. The composition of the gas thus depends upon the nature and relative quantities of the reactants and upon the reacting conditions, resulting in product gases with various concentrations of components such as nitrogen, oxygen, water vapor, and carbon dioxide. Moreover, since most carbon-containing fuels used in industrially significant gasification processes also contain sulfur or sulfur compounds, the unpurified combustion gases will contain undesirable sulfur contaminants, primarily consisting of hydrogen sulfide and carbon oxysulfide. The quantity of carbon oxysulfide in the unpurified combustion gas is usually relatively large, in most cases from about 2 to 10% of the total sulfur impurities present in the gas.

Since the quantity of combustion gases available for purification is very large, any economic advantage in removal of carbon oxysulfide impurities is of considerable significance.

Processes for the removal of carbon oxysulfide from oxygen-containing combustion gases have long been known in the art. The removal is effected by first converting the carbon oxysulfide to hydrogen sulfide, which is then removed from the gas—usually by liquid phase absorption. Conversion of the carbon oxysulfide is best effected (when the gas also contains oxygen) at a temperature between about 150° and 350° C. while absorption of hydrogen sulfide is effected at temperatures from about 10° to 70° C. Thus, in the combined sulfur removal process, a significant amount of heat must be removed from the gas between the carbon oxysulfide conversion step and the hydrogen sulfide absorption step. Moreover, the combustion gases to be purified often contain such high concentrations of hydrogen sulfide that the carbon oxysulfide conversion is impaired, thereby requiring prior removal of hydrogen sulfide before carbon oxysulfide conversion. Again this removal is conducted at a temperature of 10° to 70° C. The thermal inefficiency and requirements for heat exchangers is obvious in such a process. The cost of heat exchangers alone can be a serious economic deterrent to the success of such a process. The value of a low temperature conversion of carbon oxysulfide to overcome this serious difficulty is apparent. However, when the temperature for carbon oxysulfide conversion is merely lowered to below 150° C., other problems arise.

The usual catalyst for the oxysulfide conversion reaction is a refractory oxide carrier, which may or may not contain a metal from Group VI or VIII of the Periodic Table of Elements. With such a catalyst, at temperatures below 150° C., elemental sulfur is deposited on the catalyst causing rapid decline in catalyst activity. Other known catalysts, such as, for example, highly concentrated aqueous alkali metal phosphate solution of at least 9 pH, also rapidly decline in activity.

It has now been found that the low temperature deactivation of the above-described catalysts is caused by the presence of oxygen in the gas to be purified. In the case where solid, refractory oxide catalysts are used, the oxygen oxidizes hydrogen sulfide to elemental sulfur; and with the alkali metal phosphate solution, the oxygen leads to the formation of sulfate under the hydrolysis conditions of the reaction, resulting in rapid reduction in the pH of the solution to below the desired level of 9.

It has also been found that these disadvantages of the known processes can be overcome by prior removal of oxygen—by conversion of the oxygen to water—from the combustion gas to be purified.

SUMMARY OF THE INVENTION

Thus in broad aspect the present invention is a process for the efficient and economic removal of carbon oxysulfide from combustion gases which comprises contacting the gases with an active hydrogenation catalyst for conversion of oxygen, after which the substantially oxygen-free gases are contacted with a catalyst for the conversion of carbon oxysulfide to hydrogen sulfide which is removed by absorption.

Catalysts suitable for the removal of oxygen include any catalyst capable of catalyzing the reaction $$2H_2 + O_2 \rightarrow 2H_2O$$

Catalysts suitable for conversion of carbon oxysulfide include any catalyst catalyzing the reaction $$COS + H_2O(vapor) \rightarrow H_2S + CO_2$$
$$COS + H_2 \rightarrow H_2S + CO$$

In the process according to the invention, the conversion of carbon oxysulfide may be effected at temperatures substantially below 150° C., thus bringing the entire sulfur removal process into closer temperature balance and minimizing heat exchange in the overall process.

DESCRIPTION OF PREFERRED EMBODIMENTS OF THE INVENTION

It is preferred that the hydrogenation of oxygen be carried out at a temperature of from about 70° to 120° C. and the conversion of carbon oxysulfide be effected at a temperature between about 80° and about 120° C. These temperatures are obviously advantageous since they require minimum heat removal to cool the treated gases to the range of between 10° and 70° C. required for the absorption of hydrogen sulfide.

The preferred catalyst for the hydrogenation of oxygen is a sulfided hydrogenation catalyst, and in particular a sulfided hydrogenation catalyst which contains one or more metals from Group VI and/or Group VIII of the Periodic Table of Elements. Especially suitable is a catalyst which comprises sulfided cobalt molybdate supported on alumina.

While some conversion of carbon oxysulfide takes place in the hydrogenation of oxygen, the conversion is incomplete. Thus it is preferred that a specific high conversion activity catalyst be used in addition to the hydrogenation catalyst. Alumina is such a high activity catalyst, and since conversion activity increases with specific surface area of the catalyst, particular preference is given to alumina with a specific surface area of more than 50 square meters per gram. In a preferred aspect of the invention, the alumina catalyst for carbon oxysulfide conversion contains one or more oxides of metals from Group VI and/or Group VIII of the Periodic Table of Elements, particularly cobalt molybdate. Such catalysts are capable not only of decomposing the oxysulfide but also of hydrogenating or decomposing by hydrogenation certain other contaminants, such as unsaturated organic hydrocarbons which are often present in the combustion gas.

In another embodiment of the invention, the carbon oxysulfide conversion catalyst is a highly concentrated aqueous alkali metal phosphate solution which has a measured pH of at least 9. With this catalyst, the oxysulfide can be efficiently decomposed, when oxygen has been removed from the gas, at temperature between 80° and 120° C. The prior removal of oxygen prevents the formation of sufates in the phosphate solution, which heretofore resulted in rapid catalyst deactivation.

It is also preferred to incorporate the alkali metal phosphate on a solid carrier material such as, for example, alumina. The relatively high viscosity of highly concentrated alkali metal phosphates requires high energy input for rapid hydrolysis of the carbon oxysulfate when the catalyst is unsupported. A particularly suitable support for the catalyst is alumina which has a specific surface area in excess of 50 square meters per gram.

In the process of the invention, it is possible to completely omit any interstage heating or cooling between the oxygen hydrogenation and carbon oxysulfide conversion steps and to carry out both reaction steps at virtually the same apparent linear space velocity. Thus both catalytic zones may be incorporated in a single reaction zone or vessel of constant diameter. Bed length can, of course, be varied to achieve the optimum space velocity for the desired reaction. Space velocity used may vary over a wide range; for example between 100 to 20,000 volume hourly space velocity (VHSV). Volume hourly space velocity is herein defined to mean volume of gas at standard conditions per volume of catalyst per hour; for example, standards ml. of gas per ml. of catalyst per hour. The preferred range of space velocity for the two reaction steps is between about 1,000 to 5,000 VHSV.

EXAMPLE I

A series of experiments were carried out to determine the effect of temperature and catalyst sulfiding on the hydrogenation of oxygen in a combustion gas. The catalyst used was cobalt molybdate on alumina. The experiments were carried out in a 10 ml. capacity reactor at a pressure of 10 atmospheres absolute.

The gas had the following composition by volume:

| | |
|---|---|
| $O_2$ | 0.5 |
| $H_2S$ | 0.5 |
| $N_2$ | 2.0 |
| $H_2$ | 97.0 |

The results of the experiments are shown in Table I.

TABLE I

| Catalyst | Space velocity, VHSV | $O_2$ conversion, percent At 80° C. | $O_2$ conversion, percent At 120° C. | Sulfur deposits on catalysts |
|---|---|---|---|---|
| $Co/Mo/Al_2O_3$ | 4,000 | 10 | 20 | Yes. |
| Sulfided $Co/Mo/Al_2O_3$ | 4,000 | 100 | 100 | No. |

As shown by the results in Table I, the unsulfided catalyst is unsuitable for oxygen hydrogenation at low temperatures. At temperatures of 80° C. and 120° C., conversion is low and sulfur is deposited on the catalyst, leading to rapid deactivation. The sulfided catalyst, on the other hand, is highly active and resists sulfur deposition.

The same catalysts were tested for conversion of carbon oxysulfide in the same reactor at a pressure of 20 atmospheres absolute. The catalyst particle size used was from 50 to 100 mesh. The gas composition for these experiments was as follows.

| Component: | Percent v. |
|---|---|
| COS | 0.5 |
| $H_2S$ | 1.0 |
| $CO_2$ | 8.0 |
| $H_2$ | 90.5 |

The results are shown in Table II.

TABLE II

| Catalyst | First order reaction-rate constant, $k$, at reaction temperature of | | | | |
|---|---|---|---|---|---|
| | 70° C. | 80° C. | 90° C. | 95° C. | 110° C. |
| $Co/Mo/Al_2O_3$ | 182 | | 887 | | 2,732 |
| Sulfided $Co/Mo/Al_2O_3$ | | 144 | 260 | 341 | 504 |

The reaction rate constant, $k$, in Table II is defined as follows:

$$k = SV[-\ln(1-f)]$$

where SV represents the space velocity, in the natural logarithm and $f$ the fraction of COS converted.

As shown in Table II, the conversion activity of cobalt molybdate on alumina catalyst for conversion of carbon oxysulfide is seriously impaired by sulfiding the catalyst.

Thus it is clear from a comparison of Tables I and II that the same catalyst should not be used for both hydrogenation of oxygen and conversion of carbon oxysulfide, the former reaction being promoted by a sulfided catalyst and the latter being better promoted by an unsulfided catalyst. Thus separate catalyst reaction zones are required for the process.

EXAMPLE II

In this experiment five catalysts for the conversion of COS are compared. The experiments were carried out at a pressure of 20 atmospheres absolute. The gas composition used for these experiments was as follows.

| Composition: | Percent v. |
|---|---|
| COS | 0.5 |
| $O_2$ | 0.0 |
| $H_2S$ | 1.0 |
| $CO_2$ | 8.0 |
| $H_2$ | 90.5 |

The results are shown in Table III.

TABLE III

| Catalyst: | $k$ at 90° C. reactor Temperature |
|---|---|
| Sulfided Co/Mo/Al$_2$O$_3$ | 260 |
| Co/Mo/Al$_2$O$_3$ | 887 |
| Activated carbon impregnated with 4.2% w. K$_3$PO$_4$ | 1648 |
| Alumina | 1960 |
| Alumina impregnated with 1.9% w. K$_3$PO$_4$ | 3052 |

The particle size of the four Al$_2$O$_3$-containing catalysts was again from 50 to 100 mesh.

The results show that alumina has a considerably higher conversion activity than the non-sulfided cobalt-molybdate-on-alumina catalyst. The greatest activity is attained by impregnating alumina with the alkali metal phosphate solution.

EXAMPLE III

Another series of experiments was carried out in a small reactor filled with two catalysts, namely with 5 ml. of sulfided cobalt molybdate on alumina and with 2 ml. of alumina. The particle size of the two catalysts was again from 50 to 100 mesh.

The experiments were conducted at a pressure of 10 atm. absolute and at a space velocity of 3000 VHSV. The gas composition for these tests was as follows.

| Composition: | Percent v. |
|---|---|
| COS | 0.8 |
| O$_2$ | 0.2 |
| H$_2$S | 0.8 |
| CO$_2$ | 6.4 |
| N$_2$ | 0.8 |
| H$_2$ | 91.0 |

The results of the experiments are shown in Table IV.

TABLE IV

| Run hours (cumulative) | Reactor temperature. ° C. | Conversion, percent | |
|---|---|---|---|
| | | O$_2$ | COS |
| 1,000 | 100 | 100 | 100 |
| 1,228 | 95 | 100 | 99 |
| 1,420 | 90 | 100 | 95 |
| 1,588 | 85 | 100 | 90 |

The dew point of the gas mixture was 60° C.

Table IV shows that both the conversion of O$_2$ and that of COS were 100% for 1000 run hours at a reactor temperature of 100° C. A subsequent decrease in temperature to 95° C. resulted in a small reduction of the COS conversion to 99%, where it remained for another 228 run hours. Next, the temperature was lowered to 90° C., and kept at this level for another 192 hours, during which time the COS conversion remained at 95% at a reactor temperature of 85° C., the COS conversion dropped to 90% where it was maintained for another 168 hours. However, the oxygen conversion in these four experiments remained at 100%.

From the experiments described in this example it is therefore clearly shown that the catalysts retain their activity during a very long period and that the activity of the catalyst for the conversion of COS for the duration of the experiments depends only upon temperature. Furthermore, the hydrogenation of oxygen and the conversion of COS may be effected at the same temperature and the same apparent linear space velocity.

We claim as our invention:

1. A process for the removal of carbon oxysulfide from hydrogen-containing gases from the partial combustion of carbon-containing fuels which comprises:
   (a) substantially completely removing residual oxygen from a combustion gas by reaction with hydrogen in the presence of a highly active hydrogenation catalyst at a temperature below 150° C. followed by
   (b) catalytically hydrolyzing carbon oxysulfide in the substantially oxygen free gas to hydrogen sulfide at a temperature below 150° C.

2. The process of claim 1 wherein the oxygen hydrogenation catalyst is a sulfided hydrogenation catalyst and the hydrogenation reaction is carried out at a temperature of from about 70° to 120° C.

3. The process of claim 2 wherein the sulfided hydrogenation catalyst is alumina and a metal component selected from the group consisting of a metal of Group VI, Group VIII and mixtures thereof.

4. The process of claim 3 wherein the carbon oxysulfide catalyst is selected from the group consisting of alumina, alumina and an oxide of a metal from Group VI, Group VIII and mixtures thereof, aqueous alkali metal phosphate solution, alkali metal phosphate solution incorporated on activated carbon, and alkali metal phosphate solution incorporated on an alumina carrier having a specific surface of more than 50 square meters per gram.

5. The process of claim 2 wherein the carbon oxysulfide conversion catalyst is supported on an alumina carrier and the reactions are carried out at subsequently the same reaction temperature and substantially the same linear space velocity.

6. The process of claim 5 wherein the space velocity is between about 1000 and 5000 volumes of gas calculated at standard conditions per volume of catalyst per hour.

7. The process of claim 1 wherein the hydrogen sulfide is removed from the gas after step (b).

References Cited

UNITED STATES PATENTS

| 3,058,800 | 10/1962 | Frevel et al. | 23—2 |

FOREIGN PATENTS

| 605,838 | 7/1948 | Great Britain | 23—3 |
| 952,555 | 3/1964 | Great Britain | 23—3 |

EARL C. THOMAS, Primary Examiner

U.S. Cl. X.R.

23—210